May 16, 1939.    H. L. PALMER    2,158,885
ELECTRIC VALVE CIRCUIT
Filed April 24, 1937
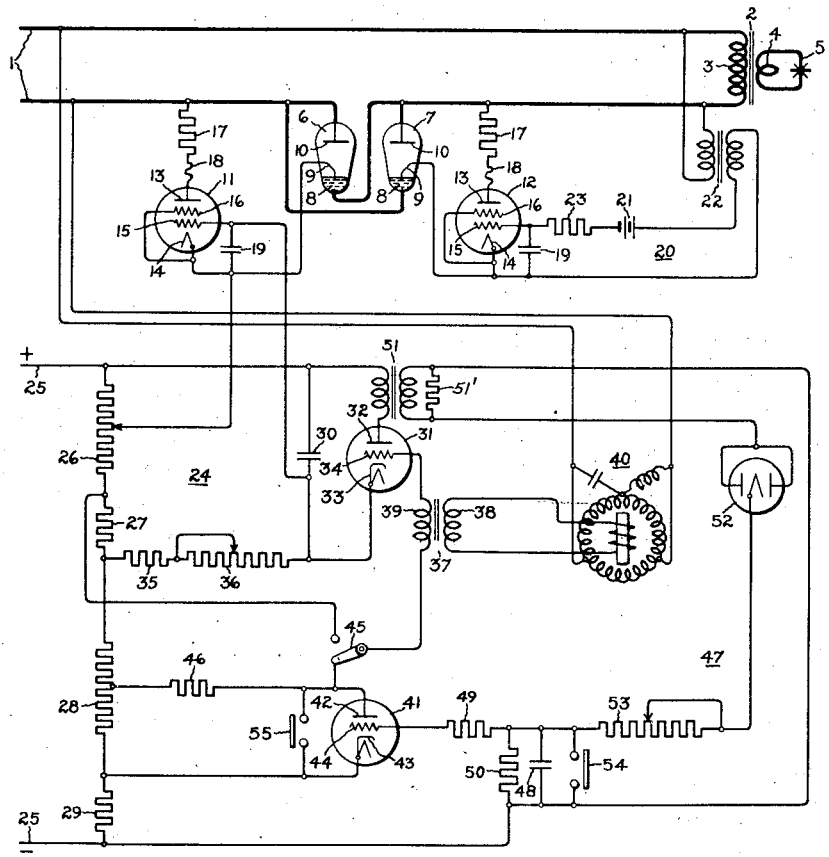
Inventor:
Harry L. Palmer,
by Harry E. Dunham
His Attorney.

Patented May 16, 1939

2,158,885

UNITED STATES PATENT OFFICE 2,158,885

ELECTRIC VALVE CIRCUIT

Harry L. Palmer, Scotia, N. Y., assignor to General Electric Company, a corporation of New York Application April 24, 1937, Serial No. 138,775

8 Claims. (Cl. 250—27)

My invention relates to electric valve circuits and more particularly to control or excitation circuits for electric valve translating apparatus.

Heretofore there have been devised numerous control circuits including electronic discharge devices for supplying periodic voltages or currents to control associated electric valve means. In many circuits, for example in welding circuits, it is desirable to control electric valve means to energize a load circuit for a predetermined interval of time and to prevent energization of the load circuit after the lapse of the predetermined time interval or after the transfer of a predetermined amount of energy to the load circuit. In view of the great flexibility of control incident to the use of arrangements employing electronic discharge apparatus to generate periodic control voltages or currents, there has been evidenced a decided need for improvements in these systems to permit accurate and precise control of the time interval in which energy is transferred to the load circuit.

It is an object of my invention to provide a new and improved electric valve circuit.

It is another object of my invention to provide a new and improved control system for electric valve translating apparatus.

It is a further object of my invention to provide a new and improved electric valve circuit for transmitting energy to a load circuit during an accurately controllable interval of time.

In accordance with the illustrated embodiment of my invention, I provide a new and improved control system for electric valve translating apparatus to effect transfer of energy from a supply circuit to a load circuit during an accurately determinable interval of time. More particularly, electric valve apparatus is employed to control the energization of the load circuit, and a periodic voltage generator including an electronic discharge device controls the electric valve apparatus. A second electronic discharge device is employed to render the first discharge device non-conductive and to maintain it nonconductive after a predetermined interval of conduction. A time determining or time delay circuit is associated with the second discharge device to render it conductive to effect application of a bias voltage to the first discharge device in accordance with the integrated value of the current transmitted by the first discharge device. The time delay circuit includes an energy storage device to effect this control and also includes adjustable means to control the time interval.

For a better understanding of my invention, reference may be had to the following description taken in connection with the accompanying drawing and its scope will be pointed out in the appended claims. The single figure of the accompanying drawing diagrammatically represents an embodiment of my invention as applied to an electric valve system for energizing a welding circuit.

In the single figure of the accompanying drawing, I have diagrammatically shown my invention as applied to an electric valve translating circuit for transmitting energy from an alternating current supply circuit 1 to a load device such as a transformer 2 having a primary winding 3 and a secondary winding 4. The secondary winding 4 may be connected to a load circuit such as a welding circuit 5. To control the energization of the transformer 2 and hence to control the energization of the load circuit 5, I employ electric valve means 6 and 7. The electric valve means 6 and 7 are preferably of the type employing an ionizable medium, such as a gas or a vapor, and in the drawing each of these valve means has been represented as being of the type employing a mercury pool cathode 8, and associated control member 9 of the immersion-ignitor type and an anode 10. In order to control the electric valve means 6 and 7 and to control thereby the transfer of energy from the supply circuit 1 to the load circuit 5, I employ associated control electric valve means 11 and 12 which are also preferably of the type employing an ionizable medium such as a gas or a vapor. Each of the control electric valves 11 and 12 is provided with an anode 13, a cathode 14, a control member such as a grid 15 and may include a screen grid 16. The anodes 13 of the control electric valve means 11 and 12 are connected to the anodes 10 of electric valves 6 and 7, respectively, through current limiting resistances 17 and current protective devices such as fuses 18; and the cathodes 14 of control valves 11 and 12 are connected to immersion-ignitor control members 9 of electric valves 6 and 7. In this manner the energization of the immersion-ignitor control members is effected in accordance with the voltage appearing across the anodes 10 and cathodes 8 at the time control valves 11 and 12 are rendered conductive. Capacitances 19 are connected across cathodes 14 and control members 15 of control valves 11 and 12 to suppress extraneous transient voltages which may be present in the control circuits therefor.

Electric valve 7 is arranged to become conductive only after electric valve 6 conducts current; in other words, electric valve 7 is the trailing valve. To effect energization of the control member 9 of electric valve 7 after electric valve 6 conducts, I employ a control circuit 20 for controlling valve 12. A suitable source of negative bias voltage, such as a battery 21, impresses a negative voltage on control member 15 of electric valve 12 to maintain this valve non-conductive, and a suitable device such as a transformer 22 may be employed to overcome the bias voltage to render electric valve 12 conductive in accordance with the energization of the load circuit 5 or in accordance with the voltage impressed across the primary winding of transformer 2. A current limiting or controlling resistance 23 may be connected in series relation with battery 21 and control member 15.

In order to supply a periodic control voltage to render electric valve 11 conductive for a predetermined time and to effect transfer of energy to the load circuit 5 during a corresponding interval of time, I provide a circuit 24. The circuit 24 includes a source of unidirectional voltage 25 of substantially constant value, a voltage divider including resistances 26, 27, 28 and 29 which are connected in series relation and are connected across the source 25, a capacitance 30 which is continuously charged from the source 25 and an electronic discharge device 31 for periodically discharging the capacitance 30. Electronic discharge device 31 is preferably of the type employing an ionizable medium such as a gas or a vapor and includes an anode 32, a cathode 33 and a control member 34. A resistance 35 and an adjustable resistance 36 are connected in series relation with electronic discharge device 31.

To render electronic discharge device 31 conductive at a predetermined time relative to the voltage of the supply circuit 1, or to effect energization of the load circuit 5 at a predetermined time during a cycle of voltage of circuit 1, I employ an arrangement including a transformer 37 having a primary 38 and a secondary winding 39 for impressing on control member 34 of electronic discharge device 31 an alternating voltage. Transformer 37 is preferably of the type designed to provide a voltage of peaked wave form to obtain precise control of the time at which discharge device 31 is rendered conductive, and primary winding 38 thereof may be energized from a suitable source of alternating current correlated in phase and frequency relative to the voltage of supply circuit 1; and in the drawing the primary winding 38 is shown as being energized from the alternating current circuit 1 through any conventional phase shifting arrangement such as the rotary phase shifter 40. This arrangement for effecting the proper synchronization between electronic discharge device 31 and the supply circuit 1 and the associated equipment is disclosed and claimed in a copending application Serial No. 585,292 of Harold W. Lord, filed January 7, 1932, entitled Circuit interrupters, and assigned to the assignee of the present application.

As an agency for supplying a negative unidirectional biasing voltage for rendering and maintaining electronic discharge device 31 nonconductive, I employ the voltage appearing across resistance 28. A second electronic discharge device 41 is connected in series relation with secondary winding 39 of transformer 37 and serves to impress the negative bias voltage thereon at the proper time. Electronic discharge device 41 may be of the type employing an ionizable medium and may include an anode 42, a cathode 43 and a control member 44. A suitable circuit controlling device such as a switch 45 may be employed to connect selectively the secondary winding 39 of transformer 37 to electronic discharge device 41 or to the common juncture of resistances 26 and 27. When switch 45 is in a position to effect the latter connection, circuit 24 will impress on control member 15 of electric valve 11 an interrupted periodic voltage, whereas when switch 45 is in a position to employ the control provided by control electronic discharge device 41 only a predetermined number of impulses of the periodic voltage will be impressed on control member 15. A current controlling resistance may be connected in series relation with electronic discharge device 41.

I provide a time determining or a time delay circuit 47 for rendering electronic discharge device 31 nonconductive in accordance with the integrated or summated value of current conducted thereby. Since the electric valves 6 and 7 are rendered conductive in accordance with the periodic voltage supplied by circuit 24, circuit 47 will operate to control the period of energization of circuit 5. The circuit 47 includes an energy storage device such as a capacitance 48 which serves to provide a positive voltage which varies in accordance with the integrated value of the current conducted by electronic discharge device 31. The electronic device 41 is maintained nonconductive by impressing on control member 44 thereof a suitable negative bias voltage and in the arrangement shown this voltage is obtained by utilizing the voltage appearing across resistance 29. This bias voltage is impressed on control member 44 through serially-connected resistances 49 and 50. Resistance 50 is employed to avoid isolation of control member 44 and to connect the control member 44 to cathode 43 through resistances 29 and 49. A suitable current responsive device, such as a current transformer 51, is associated with electronic discharge device 31 and serves to charge the capacitance 48 through a suitable unidirectional conducting device 52 which may be of the electronic discharge type. A voltage limiting element, such as a resistance 51', may be connected across the secondary winding of current transformer 51. As a means for controlling the rate at which the capacitance 48 is charged, and hence as a means for controlling the number of positive impulses of periodic voltage impressed on control member 14 of electric valve 11, I connect in series relation with the unidirectional device 52 and capacitance 48 an adjustable impedance such as an adjustable resistance 53. To discharge capacitance 48 and to reset the time determining circuit 47, I provide a suitable device such as a switch 54 connected across the terminals of capacitance 48; and to render electronic discharge device 41 nonconductive after it has effected application of the negative hold-off voltage to control member 34 of discharge device 31, I provide a switch 55 connected across discharge device 41, thereby reducing the voltage thereacross to permit its control member 44 to obtain control. Switches 54 and 55 may be interconnected and arranged to open and close synchronously or in a predetermined sequence and may be manually or automatically operated.

Although in the embodiment of my invention diagrammatically shown in the accompanying drawing I have chosen to represent the system as including two electric valve means, such as electric valves 6 and 7, oppositely disposed to conduct current during both half cycles of alternating voltage of the associated source, it is to be understood that my invention in its broader aspects may be applied to a system in which only one unidirectional conducting device is employed to transfer current during only half cycles of voltage of a predetermined polarity. Moreover, instead of employing a control circuit such as the control circuit 20 to control electric valve 7 so that it trails electric valve 6, it is to be understood that my invention may also be applied to those arrangements in which both electric valves are rendered conductive in accordance with the periodic control voltage derived from the control circuit 24.

The operation of the embodiment of my invention shown in the drawing will be considered when the system is arranged to supply energy to the load circuit 5 from the supply circuit 1 during predetermined intervals of time. If the switch 45 is in the position shown in the drawing, the electronic discharge device 31 and electric valves 6, 7, 11 and 12 will be maintained nonconductive until the voltage of peaked wave form provided by transformer 37 renders electronic discharge device 31 conductive. By the proper adjustment of the rotary phase shifter 40, the phase relationship of this voltage of peaked wave form relative to the voltage of the supply circuit 1 may be obtained so that electric valve 6 is rendered conductive precisely at predetermined times during the respective half cycle of voltage of the supply circuit 1. When transformer 37 impresses a positive voltage on control member 34 of discharge device 31, the capacitance 30 will be discharged through a circuit including the primary winding of the current responsive device 51 and discharge device 31. By virtue of this discharge there will be generated a periodic control voltage, the period of which is determined by the constants of the circuit 24 and the voltage of peaked wave form supplied by transformer 37. The positive portion of this periodic control voltage will be impressed on control member 15 of electric valve 11 to render the valve 11 conductive to effect energization of the immersion-ignitor control member 9 of electric valve means 6. The circuit through which the immersion-ignitor control member 9 is energized includes resistance 17, fuse 18, electric valve 11, the primary winding 3 of transformer 2 and the supply circuit 1. As soon as the arc is established within the electric valve 6, it is to be understood that the voltage appearing between anode 10 and cathode 8 will decrease materially, effecting thereby a rapid deenergization of the control member 9. Electric valve 6 will conduct current during the remaining portion of the positive half cycle of anode voltage applied to the electric valve 6 and electric valve 7 will conduct current during the following half cycle of voltage of supply circuit 1. The control electric valve 12 associated with electric valve 7 is maintained nonconductive by the negative voltage impressed on the control member 15 by battery 21 during the time that the primary winding 3 of transformer 2 is not energized. However, when primary winding 3 of transformer 2 is energized from the supply circuit 1 through electric valve 6, the voltage appearing across primary winding 3 is utilized by means of transformer 22 to introduce in control circuit 20 a positive voltage for overcoming the negative bias voltage provided by battery 21 to render electric valve 12 conductive, and hence to effect energization of the control member 9 of electric valve 7. In this manner it is clear that the electric valve 6 may be rendered conductive at any predetermined time during the positive half cycle of anode voltage applied thereto by the proper adjustment of the rotary phase shifter 40, and that the electric valve 6 will be rendered conductive for the entire following half cycle, or cycles, as the case may be.

As will be understood by those skilled in the art, the control circuit 24 will respond to continuously charge the capacitance 30 from the direct current source 25 and the electronic discharge device 31 will periodically discharge the capacitance 30 to produce the periodic control voltage. The time determining or time delay circuit 47 will respond to render and maintain the electronic discharge device 31 nonconductive after the circuit 24 has supplied a predetermined number of periodic impulses so that the amount of energy transferred from the supply circuit 1 to the load circuit 5 is accurately determinable. Each time the capacitance 30 discharges through the electronic discharge device 31 there will be induced in the current transformer 51 a voltage to establish a charge on capacitance 48 through the unidirectional conducting device 52 and resistance 53. The electronic discharge device 41 is maintained nonconductive by virtue of the negative bias voltage appearing across resistance 29 and impressed on control member 44 through resistances 49 and 50. The capacitance 48 is arranged to impress a positive voltage on the control member 44 which varies in accordance with the integrated value of current conducted thereby. After the occurrence of a predetermined number of impulses supplied by the circuit 24 the positive voltage supplied by capacitance 48 will increase to overcome the negative bias voltage to render electronic discharge device 41 conductive. When electronic discharge device 41 is rendered conductive, it impresses on control member 34 of discharge device 31 a negative bias voltage appearing across resistance 28 to render discharge device 31 nonconductive and to maintain it nonconductive. Of course, this negative potential is effective to render the discharge device 31 nonconductive only during those intervals in which the anode 32 is rendered negative in potential relative to the cathode 33 by the inductance of the current transformer 51.

By the proper adjustment of the adjustable resistance 53 the rate at which the capacitance 48 is charged may be controlled and hence by this arrangement it is possible to control the number of successive impulses of periodic control voltage provided by the control circuit 24. More specifically, the number of impulses which the control circuit 24 provides increases as the value of the resistance 53 is increased. The system including control circuit 24 and the time determining circuit 47 may be reset by operating switches 54 and 55 to short circuit capacitance 48 and discharge device 41 temporarily, respectively, thereby permitting the recurrence of the above described cycle of operation. Switch 54 discharges the capacitance 48 to remove the positive voltage impressed on control member 44 of discharge device 41 and switch 55 short circuits discharge device 41 to permit control member 44 thereof to regain control. When switches 54 and 55 are moved to the open circuit position, the negative voltage appearing across resistance 28 maintains discharge device 41 nonconductive and the total negative voltage appearing across resistance 24 is no longer applied to control member 34 of discharge device 31. Discharge device 31 will then be rendered conductive by the voltage of peaked wave form impressed on control member 34 of transformer 37 to initiate the above described cycle of operation.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A power circuit comprising a source of periodic current, a load circuit, means including an electronic discharge device provided with a control member for controlling the flow of current from said source to said load circuit, means for applying to said control member a bias voltage and a voltage sufficient to overcome said bias voltage to render said device conductive, means including a second electronic discharge device for applying to the control member of said first discharge device a second bias voltage to render said first discharge device nonconductive when said second discharge device is conductive, said second electronic discharge device having a control grid, means for impressing on said grid a potential tending to maintain said second discharge device nonconductive, and a time delay circuit comprising an energy storage device for impressing on said grid a voltage to render said second discharge device conductive in accordance with the integrated value of the current transmitted by said first mentioned discharge device.

2. In combination, a supply circuit, a load circuit, electric valve means for controlling the transfer of energy therebetween and including a control member, means for impressing on said control member a bias voltage and a periodic control voltage sufficient to overcome said bias voltage to render said electric valve means conductive and comprising an electronic discharge device having a control member for effecting application of said periodic control voltage only when in a conducting condition, a source of bias voltage for maintaining said electronic discharge device nonconductive, and a time delay circuit for effecting application of said source of bias voltage to said control member of said electronic discharge device to render said discharge device nonconductive in accordance with the integrated value of the current conducted thereby.

3. In combination, a supply circuit, a load circuit, electric valve means for controlling the transfer of energy therebetween and including a control member, means for impressing on said control member a bias voltage and a control voltage sufficient to overcome said bias voltage to render said electric valve means conductive comprising a source of direct current, a capacitance to be charged from said source and an electronic discharge device for discharging said capacitance, said means being arranged to supply said control voltage when said electronic discharge device is conductive, and means including a time delay circuit for rendering said discharge device nonconductive after said discharge device has conducted current for a predetermined interval of time.

4. In combination, a supply circuit, a load circuit, electric valve means for controlling the transfer of energy therebetween and including a control member, means for impressing on said control member a bias voltage and a periodic control voltage sufficient to overcome said bias voltage to render said electric valve means conductive comprising an electronic discharge device having a control member and being arranged to control said periodic control voltage for effecting control of said electric valve means, a source of bias voltage for maintaining said electronic discharge means nonconductive, and a time delay circuit for effecting application of said second mentioned bias voltage to said control member of said electronic discharge device to render said electronic discharge device nonconductive comprising a second electronic discharge device and an energy storage element for supplying an electrical quantity which varies in accordance with the integrated value of the current transmitted by said first mentioned electronic discharge device to control said second discharge device.

5. In combination, a supply circuit, a load circuit, electric valve means for controlling the transfer of energy therebetween and including a control member, means for impressing on said control member a bias voltage to maintain said valve means nonconductive and for impressing on said control member a periodic control voltage sufficient to overcome said bias voltage to render said electric valve means conductive comprising a source of direct current, a capacitance to be charged from said source and an electronic discharge device for periodically discharging said capacitance, said electronic discharge device including a control member for controlling the conductivity thereof and being arranged to render said electric valve means conductive when said device is conductive, and a time delay circuit for rendering said discharge device nonconductive when the integrated value of the current conducted thereby obtains a predetermined value including a negative bias voltage and a second electronic discharge device for impressing said negative bias voltage on said control member of said first mentioned electronic discharge device.

6. In combination, a supply circuit, a load circuit, electric valve means for transmitting energy therebetween and including a control member, means for impressing on said control member a bias voltage and a periodic control voltage for rendering said electric valve means conductive to transmit energy to said load circuit for a predetermined interval of time comprising an electronic discharge device having a control member, means for maintaining said electronic discharge device nonconductive after said device has conducted a predetermined number of current impulses including a source of negative bias voltage, a second electronic discharge device having a control member for connecting said negative bias voltage to said control member of said first mentioned electronic discharge device, and a control circuit for said second electronic discharge device including an inductive element responsive to the current impulses through said first mentioned electronic discharge device, a unidirectional conducting device and a capacitance connected to be energized from said inductive element through said unidirectional conducting device to render said second electronic discharge device conductive at the end of said predetermined interval of time.

7. In combination, an alterating current supply circuit, a load circuit, electric valve means for controlling the transfer of energy between said circuits and including a control member, means for impressing on said control member a bias voltage and a periodic control voltage sufficient to overcome said bias voltage to render said electric valve means conductive comprising an electronic discharge device having a control member for controlling said periodic control voltage, means for maintaining said electronic discharge device nonconductive after said electric valve means has conducted current for a predetermined interval of time comprising a source of bias voltage, a second electronic discharge device having a control member for impressing said bias voltage on said control member of said first mentioned electronic discharge device, and means for controlling said second electronic discharge device in accordance with the integrated value of the current conducted by said first mentioned electronic discharge device comprising an inductive element responsive to the current conducted thereby, a capacitance and a unidirectional conducting device interposed between said inductive element and said capacitance for impressing on said control member of said second electronic discharge device a voltage to render said second discharge device conductive when the integrated value of the current conducted by the first mentioned electronic discharge device attains a predetermined value.

8. A power circuit comprising a source of periodic current, a load circuit, means including an electronic discharge device provided with a control member for controlling the flow of current from said source to said load circuit, means for applying to said control member a bias voltage and a voltage sufficient to overcome said bias voltage to render said device conductive, means including a second electronic discharge device for applying to the control member of said first discharge device a second bias voltage to render said first discharge device nonconductive when said second discharge device is conductive, a time delay circuit comprising a capacitance for rendering said second discharge device conductive in accordance with the integrated value of the current transmitted by said first mentioned discharge device, and means for discharging said capacitance to reset said time delay circuit.

HARRY L. PALMER.